Aug. 5, 1969  J. F. ALIX  3,459,153
APPARATUS FOR PREVENTION OF EDGE BEAD
ON CURTAIN COATED SUBSTRATES
Filed Dec. 29, 1966

INVENTOR.
JOE F. ALIX
BY
Bayless E. Rutherford, Jr.
AGENT

United States Patent Office 3,459,153
Patented Aug. 5, 1969

3,459,153
APPARATUS FOR PREVENTION OF EDGE BEAD ON CURTAIN COATED SUBSTRATES
Joe F. Alix, Wilmington, Del., assignor to Continental Oil Company, Ponca City, Okla., a corporation of Delaware
Filed Dec. 29, 1966, Ser. No. 605,636
Int. Cl. B05c 5/00, 11/04
U.S. Cl. 118—102                               6 Claims

ABSTRACT OF THE DISCLOSURE

Apparatus for preventing edge bead formation on substrates including scraping means placed adjacent the edges of the substrate just downstream from a curtain of coating material falling from a coating head. The curtain of material is wider than the substrate. The blade is supported by a curved flexible member which also serves to support the edge of the substrate.

---

Figure 1:
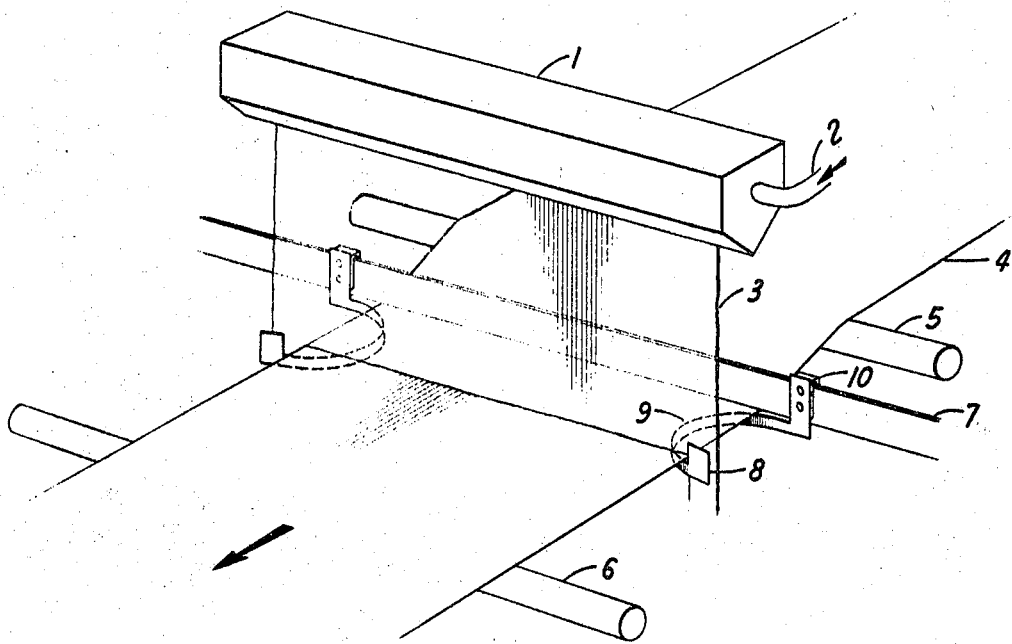

The present invention relates to improvements in the curtain-coating of various substrates with thermoplastic compositions and particularly hot melt compositions. More particularly, the present invention relates to apparatus for preventing formation of an edge bead on substrates coated with a thermoplastic composition by means of a curtain coater. In one aspect, the invention relates to an improved apparatus for the curtain-coating of various substrates with thermoplastic compositions, said apparatus containing means for eliminating an edge bead on the curtain-coated substrate.

The use of a curtain-coater to apply thermoplastic compositions, such as hot melt compositions, to various substrates is taught by French Patent No. 1,393,629. Also, an article in Modern Packaging (July 1961, pages 134–140 and 198, and particularly pages 140 and 198) teaches the use of a curtain-coater to apply wax—"Elvax" compositions to a substrate. According to this method, the substrate is passed through a gravitating curtain of hot melt composition supplied from an overhead chamber equipped with a slot orifice. With a metered flow of hot melt composition falling in the curtain, the coating weight can be controlled by varying the speed at which the substrate passes through the curtain.

The apparatus is useful for coating a variety of substrates, such as paperboard, corrugated paperboard, metal foil-paper laminates, synthetic resin films, plywood and roll stock, for example sulfite and clay-coated sulfite, and glassine. The apparatus is particularly useful for applying medium viscosity (i.e., 500 to 80,000 cps. at 250° F.) thermoplastic compositions to any of the aforementioned substrates.

While the curtain-coating apparatus has many advantages and is becoming well accepted commercially, particularly for medium viscosity thermoplastic compositions, the apparatus has the following disadvantages, particularly with continuous roll stock.

In the curtain coating of continuous roll stocks (e.g., web stock) with a medium viscosity thermoplastic composition it has been my experience that normally a bead of coating material forms on the edge of the web. This bead is typically about ⅛-inch wide, or less, and results from an excess of coating material being deposited in this area. The excess coating is distributed primarily on the top (coated) side of the web, although some coating may be deposited on the underside of the web. With very viscous blends (i.e., above 3,000 cps. at 250° F.) a selvage of coating may extend past the edge of the web.

The edge bead causes problems in rewinding the coated web, since the excess thickness on the edge of the web causes the center of the roll to be loose. Also, after the rewound rolls build up to some size, the stresses created may cause the edges of the web to tear.

While there are several patents which teach the removal of edge beads *after* they have formed on the web stock, to my knowledge, there are no teachings anywhere of a method or apparatus for *preventing* the formation of the edge beads.

I have observed that the edge bead is caused by a fillet of coating film which is formed between the edge of the web and the falling curtain. I have discovered that by placing scraping means so as to contact the edges of the web in close proximity to the curtain the fillet is split, thereby preventing any excess of coating material from reaching the edge of the web, with the end result being the prevention of the formation of the edge bead.

Broadly stated, the present invention relates to a method of preventing the formation of an edge bead on substrates, and particularly roll stock, coated with a thermoplastic composition, and particularly a hot melt composition, by means of a curtain coater, wherein the method comprises placing a scraping means, preferably in close proximity to the curtain, so as to contact the edge of the substrate after the substrate has passed through the curtain coater. In one aspect, the invention relates to an improved apparatus for the curtain coating of various substrates, and particularly roll stock, with thermoplastic composition, and particularly hot melt compositions, said apparatus containing scraping means located in close proximity to the falling curtain and being in contact with the moving substrate or web.

The term "roll stock" as used herein refers to web stock and other materials which are handled in rolls, such as glassine, metal oil, and plastic-paper laminate.

Figure 2:
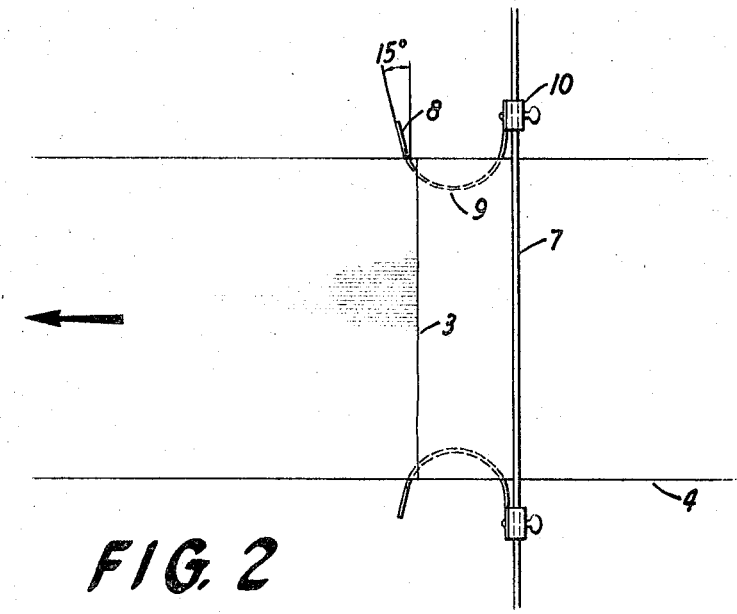

Referring to the accompanying drawings which illustrate my improved apparatus and method by way of example and not for the purpose of limitation:

FIGURE 1 is a somewhat schematic view of a conventional curtain coating apparatus containing, in addition, the apparatus of my invention; and FIGURE 2 is a vertical, close-up view of the scraping means which forms a salient feature of my invention.

Referring now more particularly to FIGURE 1, the curtain coating apparatus is conventional. In the curtain coating apparatus, the heated, thermoplastic composition enters the overhead chamber 1 by way of a conduit 2. The overhead chamber is equipped with a slot orifice thereby forming a gravitating curtain 3 of the heated, thermoplastic composition. The roll stock 4, which is to be coated is fed by means of rollers 5 and 6 through the gravitating curtain 3. Prior to passing through the gravitating curtain, the roll stock 4 passes underneath an air breaker bar 7. It may be well to note at this time that usually in curtain coating apparatus the gravitating curtain 3 extends beyond the edge of the roll stock 4.

Still referring to FIGURE 1, the apparatus comprising my improvement will be described. The scraping means (i.e., scrapers or knives) 8 is attached by means of curved arm 9 to the air breaker bar 7 by means of a clamp 10.

Usually, a scraping means 8 is located on both sides of the roll stock. For reasons of convenience, we have chosen to define the scraper means in a singular rather than plural number.

Referring now to FIGURE 2, a more detailed description will be given to the apparatus comprising my invention. The scraping means 8 is at the end of an arm 9 which is attached to the air breaker bar 7 by means of clamp 10. While the air breaker bar 7 has proved to be a satisfactory means of attaching the scraping means 8 to the curtain coater apparatus, other means of attachment can be used. One alternative is to attach the scraping means to a grate which is located on top of the trough which catches the excess of the thermoplastic material in the gravitating curtain.

The arm 9, which is underneath the roll stock 4, is shown as being curved in order to be flexible. Flexibility is desirable in those cases where the position of the edge of the web varies. In installations where the web position is controlled, the scraping means can be rigidly mounted. While the drawing (FIGURE 1 particularly) shows the scraping means as being attached to the arm at the lower edge of the scraping means, it is also satisfactory to attach the arm to the upper edge of the scraping means.

The position of the scraper is a matter of considerable importance. It should be immediately adjacent to the web and in close proximity to the gravitating curtain. While the scraper should be as close as possible to the curtain, I have found that in practice a spacing of from about 1 to about 2 inches is required due to the movement of the curtain.

The scraper, preferably, should be of fairly thin material, such as spring steel. The leading edge should be sharpened moderately, but not be so sharp as to cut the roll stock. The scraper should be mounted approximately perpendicularly to the plane of the web. It should be sufficiently wide (preferably at least 1 inch) to prevent bypassing of excess coating material back onto the roll stock. Preferably, the trailing edge of the scraper should be rotated about 15° away from the edge of the roll stock to minimize drag. Preferably, this angle should be adjustable.

While we have used the term "scraper" herein, other terms, such as "cutter" or "interrupter" are also applicable. In one sense, the means *cuts* the excess of thermoplastic composition; but it does not cut the roll stock. In another sense, the means *interrupts* the thermoplastic composition and thereby prevents an excess from forming an edge bead. In still another sense, the means *scrapes away* the fillet of thermoplastic composition. We have chosen the term "scraper" since we consider it more definite to the action which occurs.

While the description of my improved apparatus has been restricted to a scraper, it is to be understood that other means can be used, such as hot wires and hot air jets.

The method and apparatus of my invention are useful in applying thermoplastic compositions to any of the substrates described in the foregoing, wherein the thermoplastic composition has a viscosity in the range of from about 500 to about 80,000 cps. at 250° F. The method and apparatus of my invention are particularly effective when the thermoplastic composition has a viscosity in the range of from about 1,000 to about 55,000 cps. at 250° F. It should be emphasized that the critical feature of the thermoplastic composition is its viscosity and not its composition. The term "thermoplastic" is well understood in the art and refers to compositions having the property of becoming plastic under application of heat, rigid at normal temperatures and plastic on reapplication of heat. The preferred thermoplastic compositions are the hot melt compositions. In addition, examples of suitable thermoplastics include polyethylene, polypropylene and polyvinylchloride.

Referring now to the preferred thermoplastic composition, the term "hot melt composition" as used herein is used in the commonly accepted manner as being formulations of petroleum derived waxes containing from about 10 to about 90 percent by weight of a wax-compatible modifier. Examples of suitable hot melt compositions include blends of microcrystalline and/or paraffin waxes with ethylene-vinyl acetate copolymers, with ethylene-ethyl acrylate copolymers, with ethylene-isobutyl acrylate copolymers, with polyethylene, with polyisobutylene, with ethyl cellulose and with butadiene-styrene copolymers. Preferred hot melt compositions include blends of microcrystalline and/or paraffin waxes with ethylene-vinyl acetate copolymers, with ethylene-ethyl acrylate copolymers, and with ethylene-isobutyl acrylate copolymers.

Ethylene-vinyl acetate copolymers are prepared by copolymerizing a mixture of ethylene and vinyl acetate in the presence of a free radical catalyst, e.g., tertiary butyl hydroperoxide, in a suitable reactor at elevated temperatures and pressures. The copolymers are usually identified by a combination of the ratios of the co-monomers present in the product and by the melt index. The test for determining melt index (ASTM D–1238–57T) consists of determining the amount in grams (melt index value) of the copolymer that can be pressed through a standard orifice in ten minutes at 190° C. with a piston weighing 2160 grams.

Ethylene-vinyl acetate copolymers are available in commercial quantities from E. I. duPont de Nemours & Co., Inc. and are sold under the "Elvax" trademark. Properties of various "Elvax" copolymers are as follows:

| Property | Elvax 360 | Elvax 260 | Elvax 250 | Elvax 240 | Elvax 220 | Elvax 150 |
| --- | --- | --- | --- | --- | --- | --- |
| Co-monomer ratios: | | | | | | |
| Percent ethylene | 76–74 | 73–71 | 73–71 | 73–71 | 73–71 | 78–72 |
| Percent vinyl acetate | 24–26 | 27–29 | 27–29 | 27–29 | 27–29 | 22–28 |
| Melt index [1] | 11–3 | 5–7 | 12–18 | 22–28 | 125–127 | 32–34 |
| Density at 23° C | .95 | .954 | .951 | .951 | .949 | .957 |
| Refractive index, 25°C., D line | 1.491 | 1.485 | 1.485 | 1.485 | 1.485 | 1.482 |
| Softening point, ring-and-ball, °F | 370 | 310 | 280 | 250 | 192 | 243 |

[1] The melt index is determined by ASTM method No. D–1238–57T.

In order to disclose the nature of the present invention still more clearly, the following illustrative examples will be given. It is to be understood, however, that the invention is not to be limited to the specific conditions or details set forth in these examples except insofar as such limitations are specified in the appended claims.

EXAMPLE 1

This example demonstrates the formation of an edge bead when the scraping means of this invention is not employed.

Using conventional curtain coating apparatus (i.e., as described in the foregoing, but not including the cutting means) glassine was coated with a hot melt composition having the following composition:

|  | Percent |
| --- | --- |
| "Elvax" 260 | 17.5 |
| "Elvax" 360 | 17.5 |
| α-Methyl styrene-vinyl toluene copolymer [1] | 25.0 |
| Paraffin wax, M.P. 145–150° F. | 40.0 |

[1] Containing 25–35% (wt.) α-methyl styrene, 65–75% (wt.) vinyl toluene, and having a ball-and-ring softening point of 120° C.

The composition had a viscosity of 45,000 cps. at 250° F. The conditions of operation were:

Coating temperature _____ ° F__ 370
Web speed _____ f.p.m__ 1200
Coating weight _____ lb./ream__ 6.5

The coated glassine had a heavy edge bead which interfered with roll winding.

EXAMPLE 2

This example illustrates the beneficial effect of the use of the scraping means of this invention.

Glassine was coated using the composition and operating conditions of Example 1. In this example, scrapers were hand-held on both sides of the glassine, adjacent to the glassine and in close proximity to the falling curtain.

The use of the hand-held scraper reduced the formation of the bead to a level which did not interfere with winding.

The following examples illustrate the beneficial effect of the use of the scraping means of this invention when using a variety of hot melt compositions and on a variety of substrates. In all cases use of the scraping means provided a substantial improvement in the prevention of the edge bead.

EXAMPLE 3

Composition: Percent
"Elvax" 420 _____ 10
"Elvax" 360 _____ 10
Rosin ester _____ 10
Microcrystalline wax, M.P. 180° F. _____ 15
Paraffin wax, M.P. 145–150° F. _____ 55

The composition had a viscosity of 800 cps. at 250° F.

Substrate:
  Sulfite _____ lb__ 25½
Operating conditions:
  Coating temperature _____ ° F__ 285
  Web speed _____ f.p.m__ 1000
  Coating wt. _____ lb./3000 ft.²__ 9.2

EXAMPLE 4

Composition: Percent
"Elvax" 620 _____ 35
Rosin ester _____ 22
Paraffin wax, M.P. 155–160° F. _____ 43

The composition had a viscosity in the range of 10,000 to 20,000 cps. at 250° F.

Substrate:
  Aluminum foil laminate
Operating conditions:
  Coating temperature _____ ° F__ 360
  Web speed _____ f.p.m__ 500
  Coating wt. _____ lb./3000 ft.²__ 21.6

EXAMPLE 5

Composition: Percent
"Elvax" 260 _____ 30
Rosin ester _____ 15
Paraffin wax, M.P. 140–142° F. _____ 55

The composition had a viscosity of 4800 cps. at 250° F.

Substrate:
  Sulfite _____ lb__ 25½
Operating conditions:
  Coating temperature _____ ° F__ 300
  Web speed _____ f.p.m__ 1100
  Coating wt. _____ lb./3000 ft.²__ 6.4

EXAMPLE 6

Composition: Percent
"Elvax" 260 _____ 17.5
"Elvax" 360 _____ 17.5
α-Methyl styrene-vinyl toluene copolymer[1] __ 25.0
Butyl rubber _____ 1.0
Paraffin wax, M.P. 145–150° F. _____ 39.0

[1] Containing 25–35% (wt.) α-methyl styrene, 65–75% (wt.) vinyl toluene, and having a ball-and-ring softening point of 120° C.

Substrate:
  Glassine _____ lb__ 30
Operating conditions:
  Coating temperature _____ ° F__ 370
  Web speed _____ f.p.m__ 1200
  Coating wt. _____ lb./3000 ft.²__ 8.3

EXAMPLE 7

Composition: Percent
"Elvax" 250 _____ 32
Rosin ester _____ 10
Paraffin wax, M.P. 140–142° F. _____ 58

The composition had a viscosity of 3,000 cps. at 250° F.

Substrate:
  S.C. kraft _____ lb__ 50
Operating conditions:
  Coating temperature _____ ° F__ 280
  Web speed _____ f.p.m__ 700
  Coating wt. _____ lb./3000 ft.²__ 14.0

The invention having thus been described, what is claimed and desired to be secured by Letters Patent is:

1. In a coating apparatus for applying a coating of a thermoplastic composition to an elongated substrate, wherein said composition has a viscosity in the range of from about 500 to about 80,000 cps. at 250° F., and wherein said apparatus comprises:
   (a) means for forming a gravitating curtain of said thermoplastic composition, and
   (b) means for passing an elongated substrate through said gravitating curtain, wherein said gravitating curtain extends beyond the edge of said substrate,
the improvement which comprises:
   a blade scraper having a substrate engaging edge, mounted on a flexible arm, said blade scraper being located immediately downstream from said gravitating curtain, said edge being substantially perpendicular to the plane of said elongated substrate, and in contact with the edge of said substrate.

2. An apparatus as claimed in claim 1 wherein the blade scraper is rotated about 15° downstream from a line perpendicular to the longitudinal axis of the substrate.

3. An apparatus as claimed in claim 1 wherein the scraper blade and flexible arm are made of spring steel.

4. In a coating apparatus for applying a coating of a thermoplastic composition to an elongated substrate, wherein said composition has a viscosity in the range of from about 500 to about 80,000 cps. at 250° F., and wherein said apparatus comprises:
   (a) means for forming a gravitating curtain of said thermoplastic composition, and
   (b) means for passing an elongated substrate through said gravitating curtain, wherein said gravitating curtain extends beyond the edge of said substrate,
the improvement which comprises:
   a blade scraper having a substrate engaging edge, mounted on a bowed flexible arm, said arm being in contact with the bottom of said elongated substrate, said blade scraper being located immediately downstream from said gravitating curtain, said edge being substantially perpendicular to the plane of said elongated substrate, in contact with the edge of said substrate.

5. An apparatus as claimed in claim 4 wherein the blade scraper is rotated about 15° downstream from a line perpendicular to the longitudinal axis of the substrate.

6. An apparatus as claimed in claim 4 wherein the scraper blade and flexible arm are made of spring steel.

References Cited

UNITED STATES PATENTS

| | | | |
|---|---|---|---|
| 593,896 | 11/1897 | Johnson | 118—325 X |
| 1,281,373 | 10/1918 | Holmes | 118—102 |
| 1,885,167 | 11/1932 | Abrams. | |
| 3,140,960 | 7/1964 | Grabczyk et al. | |

FOREIGN PATENTS 722,582  11/1965  Canada.

WALTER A. SCHEEL, Primary Examiner

J. P. McINTOSH, Assistant Examiner

U.S. Cl. X.R.

118—325